United States Patent
Cavaliere et al.

(10) Patent No.: US 9,821,491 B2
(45) Date of Patent: Nov. 21, 2017

(54) METHOD FOR PRODUCING THERMOSETTING COMPOSITE PARTS BY DRAPE FORMING OF PREIMPREGNATED MATERIAL

(71) Applicant: AIRBUS GROUP SAS, Paris (FR)

(72) Inventors: Frederick Cavaliere, Montigny le Bretonneux (FR); Alain Renoncourt, Malakoff (FR); Patrice Lefebure, Orvault (FR)

(73) Assignee: AIRBUS, Blagnac (FR)

( * ) Notice: Subject to any disclaimer, the term of this patent is extended or adjusted under 35 U.S.C. 154(b) by 139 days.

(21) Appl. No.: 14/432,748

(22) PCT Filed: Oct. 8, 2013

(86) PCT No.: PCT/FR2013/052389
§ 371 (c)(1),
(2) Date: Mar. 31, 2015

(87) PCT Pub. No.: WO2014/057206
PCT Pub. Date: Apr. 17, 2014

(65) Prior Publication Data
US 2015/0224674 A1  Aug. 13, 2015

(30) Foreign Application Priority Data

Oct. 8, 2012 (FR) .................................. 12 59552

(51) Int. Cl.
*B29B 11/16* (2006.01)
*B29C 70/38* (2006.01)
(Continued)

(52) U.S. Cl.
CPC .............. *B29B 11/16* (2013.01); *B29B 15/10* (2013.01); *B29C 35/02* (2013.01); *B29C 35/16* (2013.01);
(Continued)

(58) Field of Classification Search
CPC ....................................................... B29B 11/16
(Continued)

(56) References Cited

U.S. PATENT DOCUMENTS 4,774,122 A * 9/1988 Adler ...................... C23C 18/22
156/151
4,804,427 A * 2/1989 Paul ........................ B29C 70/50
156/180

(Continued)

OTHER PUBLICATIONS

"Glossary of terms In: Composites", 2Dec. 1, 2001, pp. 1115-1117, 1120-1121, 1124-1125, 1128-1129, 1132-1133, 1136, ASM International, USA.

(Continued)

*Primary Examiner* — Brent O'Hern
(74) *Attorney, Agent, or Firm* — Im IP Law; C. Andrew Im

(57) ABSTRACT

A process for fabricating a partially polymerized prepreg material. Fibers are impregnated with thermosetting resin. The resin is partially polymerized to a degree of polymerization between 10% and 60%. The thermosetting composite parts are produced by drape forming of the prepreg material. The material laid-up in the form of tapes and heated at a temperature above the glass transition temperature of the prepreg state. The laid-up material is pressed and cooled to return the laid-up material to a temperature below the glass transition temperature of the prepreg state in question.

4 Claims, 2 Drawing Sheets

(51) Int. Cl.
| | |
|---|---|
| B29B 15/10 | (2006.01) |
| B29C 35/02 | (2006.01) |
| B29C 35/16 | (2006.01) |
| B29C 70/34 | (2006.01) |
| B32B 5/12 | (2006.01) |
| B32B 5/26 | (2006.01) |
| B32B 7/04 | (2006.01) |
| B32B 37/06 | (2006.01) |
| B32B 37/08 | (2006.01) |
| B32B 37/10 | (2006.01) |
| D06M 15/55 | (2006.01) |
| B29K 101/10 | (2006.01) |
| B29K 105/08 | (2006.01) |
| B29C 35/04 | (2006.01) |
| B29C 35/08 | (2006.01) |
| B29C 37/00 | (2006.01) |
| D06M 101/40 | (2006.01) |

(52) U.S. Cl.
CPC ............ *B29C 70/34* (2013.01); *B29C 70/386* (2013.01); *B32B 5/12* (2013.01); *B32B 5/26* (2013.01); *B32B 7/04* (2013.01); *B32B 37/06* (2013.01); *B32B 37/08* (2013.01); *B32B 37/10* (2013.01); *D06M 15/55* (2013.01); *B29C 37/0064* (2013.01); *B29C 2035/046* (2013.01); *B29C 2035/0822* (2013.01); *B29C 2035/0838* (2013.01); *B29K 2101/10* (2013.01); *B29K 2105/0872* (2013.01); *B32B 2260/023* (2013.01); *B32B 2260/046* (2013.01); *B32B 2262/106* (2013.01); *B32B 2305/18* (2013.01); *B32B 2305/74* (2013.01); *B32B 2605/18* (2013.01); *D06M 2101/40* (2013.01); *Y10T 428/24074* (2015.01); *Y10T 428/249921* (2015.04); *Y10T 442/20* (2015.04)

(58) Field of Classification Search
USPC .......................................................... 428/107
See application file for complete search history.

(56) References Cited

U.S. PATENT DOCUMENTS

| | | | |
|---|---|---|---|
| 4,877,820 A | 10/1989 | Cowan | |
| 5,248,711 A * | 9/1993 | Buyny | ............... C08J 5/24 523/500 |
| 5,587,041 A | 12/1996 | Sandusky et al. | |
| 6,764,754 B1 * | 7/2004 | Hunter | ............... B29C 70/30 427/386 |

OTHER PUBLICATIONS

"Metal Foils for Use With Organosilicon-based Circuit Board Laminates," Research Disclosure, Dec. 1, 1993, pp. 798-799, No. 356, Emsworth, GB.

Rosato et al., "Thermosets In: Plastics engineered product design," Jan. 1, 2003, pp. 13-15, Elsevier.

Lee et al., "Glass Transition Temperature (Tg) Determination of Partially Cured Thermosetting Systems," Polymer and Science Engineering, Aug. 1, 1981, pp. 787-791, vol. 21, No. 12.

* cited by examiner

METHOD FOR PRODUCING THERMOSETTING COMPOSITE PARTS BY DRAPE FORMING OF PREIMPREGNATED MATERIAL

RELATED APPLICATIONS

This application is a §371 application from PCT/FR2013/052389 filed Oct. 8, 2013, which claims priority from French Patent Application No. 12 59552 filed Oct. 8, 2012, each of which is herein incorporated by reference in its entirety.

TECHNICAL FIELD OF THE INVENTION

The present invention relates to the field of thermosetting composite parts, and more particularly to a process for fabricating such parts by drape forming of partially polymerized prepreg material.

The present invention relates in particular to aeronautical composite parts and in particular any aircraft or helicopter structural part: fuselage, wing, nose cone, radome, vertical stabilizer, horizontal planes, helicopter airframe, blades, shrouded tail rotor, etc., but may also be extended to all thermosetting composite parts outside of the aeronautical field.

BACKGROUND OF THE INVENTION

Currently, thermosetting composite parts are produced from material prepregged with resin in the form of strips or tapes (plies) in the non-polymerized state. These materials are generally stored at −18° C. in order to keep the resin at a degree of polymerization of less than 20%. The drape forming of the plies can be carried out manually or automatically and in particular according to the ATL (Automated Tape Laying) or AFP (Automated Fiber Placement) technique. This drape forming is carried out via a mechanical head equipped with means for supplying the plies and with pressure means, and optionally with means for cutting the plies and with heating means. The material is heated just before lay-up in order to increase the tackiness of the resin during the drape forming of the various plies one on top of the other. The application of pressure to the plies is carried out via a pressure roll.

The drawback of these types of techniques is that they require intermediate vacuum compactions to be carried out as soon as a few layers are draped, for example every 5 or 6 layers and that vary from one part to another. This intermediate compaction makes it possible to partly evacuate the air trapped between plies during the drape forming and to ensure correct holding of the various layers of the laminate to one another, by action of the tack.

In order to overcome this type of drawback, certain processes use a pressure roll equipped with a sonotrode (UTL or Ultrasonic Tape Laying technique) in order to reduce the amount of air trapped between the plies by virtue of the ultrasounds emitted. However, the use of such a process decreases the lay-up rate and therefore reduces the productivity, and does not completely prevent the need for intermediate compactions.

Intermediate compactions are very costly in terms of time, complicate the process and the device used, and do not eliminate the need for polymerizing the part under pressure in an autoclave in order to ensure a good performance of the material of the final part.

OBJECT AND SUMMARY OF THE INVENTION

The object of the present invention is therefore to overcome one or more of the drawbacks of the prior art by proposing a process for producing thermosetting composite parts by drape forming of plies of prepreg material which makes it possible to eliminate the intermediate compactions without adversely affecting the lay-up rate, and makes it possible in certain cases to carry out the final polymerization step without an autoclave.

For this, the present invention proposes a process for fabricating a partially polymerized prepreg material, said process comprising a step of impregnating fibers with thermosetting resin and a step of partially polymerizing the resin to a degree of polymerization of between 10% and 60%. Preferably, the partial polymerization of the resin is carried out to a degree of polymerization of between 20% and 50%.

According to various embodiments of the invention, the step of impregnating the fibers is carried out before or after the step of partially polymerizing the resin.

The invention also relates to a partially polymerized prepreg material, capable of being obtained by the process as described above. Such a material may be stored at ambient temperature, of the order of 20° C., for a long period of the order of several months.

According to one embodiment of the invention, the material consists of a multilayer of partially polymerized resins.

The invention also relates to a process for producing thermosetting composite parts by drape forming of the partially polymerized prepreg material described above, said process comprising:
  a step of laying-up the material in the form of tapes,
  a step of heating the laid-up material, at a temperature above the glass transition temperature of the prepreg state in question,
  a step of pressing the laid-up material,
  a step of cooling the laid-up material, making it possible to return to a temperature below the glass transition temperature of the prepreg state in question,
  the temperatures of the heating and cooling steps and the pressure of the pressing step being determined so that the part obtained has open voids.

According to various embodiments of the invention, the heating step is carried out immediately before the pressing step or simultaneously with the pressing step.

According to various embodiments of the invention, the cooling step is carried out immediately after the pressing step or simultaneously with the pressing step.

According to one embodiment of the invention, a final polymerization step is carried out in an oven.

According to one embodiment of the invention, the process comprises a first step of storing the prepreg material at ambient temperature.

The invention also relates to a thermosetting composite part capable of being obtained by a process as described above.

BRIEF DESCRIPTION OF THE DRAWINGS

The following detailed descriptions, given by way of example, and not intended to limit the present invention solely thereto, will be best be understood in conjunction with the accompanying figures:

FIG. 1: change in the degree of pre-polymerization before and after drape forming;

FIG. 2: change in the pressure, temperature and viscosity parameters during the drape forming; and FIG. 3: change in the degree of polymerization during the final polymerization cycle.

DETAILED DESCRIPTION

Figure 1:
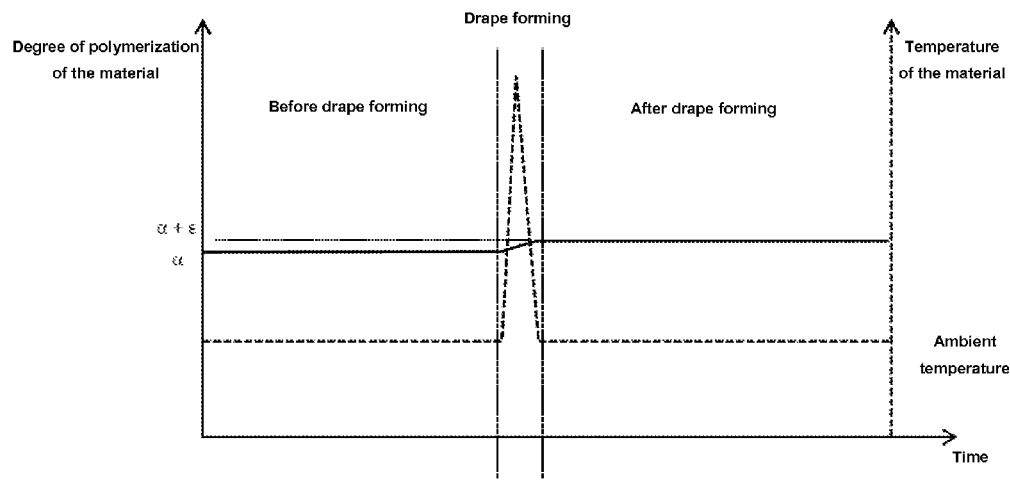
FIGS. 1, 2 and 3 illustrate the changes in the following parameters as a function of time.

The present invention relates to a process for producing thermosetting composite parts by drape forming of fibers of a novel prepreg material that has previously undergone a partial polymerization cycle, also referred to as a semi-cured prepreg material.

The drape forming step carried out in the process according to the invention is preferably manual, semi-automatic or automatic.

Manual drape forming is carried out entirely by hand.

Semi-automatic drape forming consists in reducing the manual intervention to the handling of the plies. The cutting of the plies, the correct positioning of the plies on the mold as they are put in place and the passing from one work station to another are carried out automatically.

Automatic drape forming consists in using a machine which itself lays-up the cut plies, one by one.

During the drape forming step, the material is heated discretely so as to allow the attachment of the plies to one another, and pressed by a roll.

More specifically, the heating is carried out at certain locations of the interface of the ply already laid-up and the ply laid-up at the time of the drape forming. The heating is carried out by any method known to a person skilled in the art and for example by torch, radiant, laser, infrared, etc. heating. During heating, the viscosity state of the prepreg material is very close to that of a non-polymerized material. This state enables the attachment of the plies to one another.

The material is cooled immediately after the passage of the compression roll. The heating/pressure and pressure/cooling pairings of the prepreg material are defined so that the plies have the necessary attachment to one another after the passage of the roll.

When the drape forming step is completed, the final polymerization of the material forming the part obtained may be carried out in an oven if applying a vacuum during the final polymerization step makes it possible to drain all the air contained in the laminate, and in an autoclave if this is not the case.

The various parameters of the process and more specifically:
- the degree of pre-polymerization of the semi-cured material in question,
- the heating temperature of the material at the time of the drape forming which must be greater than the glass transition temperature of the semi-cured material in question, the glass transition temperature being defined as representing the temperature range across which the material passes from a rubbery state to a rigid, solid, glassy state, this glass transition temperature of the semi-cured material is preferably between 20° C. and 150° C. This temperature depends on the degree of pre-polymerization,
- the pressure of the roll,
- the temperature on leaving the roll, which must be very rapidly below the glass transition temperature of the semi-cured material,
- the type of heating, which may be laser, infrared, hot air or other, are determined so that the laminate obtained has open cavities or non-closed voids. The open voids associated with a very high vacuum and with a good melt flow of the resin of the semi-cured laminate during the final polymerization, allow, in certain cases, a final polymerization in an oven, instead of carrying out a polymerization in an autoclave as is the case for the prior art techniques. A very high vacuum must be attained before the temperature exceeds the glass transition temperature of the semi-cured material in question.

More specifically, the heating temperature during the drape forming is above the glass transition temperature of the semi-cured material and below or equal to 250° C.

The glass transition temperature is measured by differential calorimetry analysis (DSC) according to the ISO 11357-2 standard, following the inflection point method. This Tg measurement is carried out on the partially polymerized prepreg material before drape forming.

The cooling temperature is below the glass transition temperature of the semi-cured material and above or equal to 20° C.

The control of the discrete attachment is made possible by the fact that the material used within the context of the process according to the invention is semi-cured.

Within the context of the invention, a "partially polymerized" or "semi-cured" material is understood to mean a material that has undergone a partial polymerization cycle and the degree of polymerization of which is between 10% and 60%, and preferably between 20% and 50%. Preferably, the degree of polymerization should remain below the gel point of the resin used for impregnation. The degree of polymerization is also selected in order to enable the storage of the material at ambient temperature, of the order of 20° C., for a long period of the order of several months, or even years.

The degree of polymerization is measured by differential calorimetry analysis (DSC) according to the ISO 11357-5 standard. The degree of polymerization is calculated before drape forming from the reaction enthalpy of the partially polymerized material tested and from the reaction enthalpy of the same material, non-polymerized and acting as a reference.

The novel partially polymerized prepreg material used in the process of the present invention may be obtained by various methods of fabricating the material.

A first method of fabricating the material consists in firstly carrying out a conventional prepregging of carbon or glass fibers or any other fibers that can be used for the production of structures. The impregnating resins can be of epoxide, polyimide, cyanate or benzoxazine type, or any other type of thermosetting resins that can be used for producing a prepreg for the fabrication of structures. These impregnated fibers are then placed in separators and wound around a mandrel. The bobbins formed by the wound prepreg fibers are then semi-cured, that is to say partially polymerized, with temperatures which depend on the reactivity of the resin in question but which are between 50° C. and 180° C. with times that may be between a few minutes to a few hours. It is necessary during this process to verify that the separators are compatible with the semi-curing temperatures, that they do not pollute the prepreg during the semi-curing phase, that the degree of polymerization is indeed the same throughout (+/−epsilon). This process has the advantage of not modifying the prepreg production method that is already known very much.

Another method of fabricating the material consists in prepregging fibers with resin that has previously been partially polymerized and maintained at a temperature above the glass transition temperature of the semi-cured material during the impregnation phase, calendering phase, and if necessary during the phase of inserting thermoplastic nodules on the surfaces of the prepreg if the latter requires it. This process has the advantage of a good control of the degree of partial polymerization, makes it possible to retain a good alignment of the fibers, makes it possible to introduce fewer stresses into the semi-cured material which may facilitate handling thereof, and above all makes it possible to eliminate the separators.

Another method of fabricating the material, which is a mixture of the two preceding methods, consists in prepregging fibers in a bath of optionally partially pre-polymerized resin. These prepreg fibers then undergo a semi-curing cycle in order to bring the prepreg material to the required degree of polymerization, before or after winding on a mandrel.

In all the methods of fabricating the material, the partial polymerization is carried out at high temperature or in any other manner that enables the polymerization, and for example under the action of microwaves, by electron-bombardment polymerization, etc.

With these types of methods of fabricating the material, the energy expended for the semi-curing of the material (a few hours at temperatures of 50° C. to 180° C.) is much lower than the energy expended for storing it at −18° C. over long durations that may stretch to several months as is the case in the prior art.

According to one variant, the prepreg material consists of a multilayer of resins, that is to say several resins, selected from the types of resins described above. The resins are either resins of different types that are compatible with one another with an identical degree of polymerization, or an identical type of resin with different degrees of polymerization, preferably within the range 10%-60%, or a mixture of resins of different types and with different degrees of polymerization.

According to one embodiment, a multilayer prepreg is produced with a first resin with a degree of polymerization that is sufficiently advanced to ensure a good performance of the material at the core of the ply, it being possible for the degree of polymerization in this case to be greater than 60%, and a second resin at the surfaces of the ply in order to improve the drapability. A better fluidity of the resin at the drape forming temperature favoring a good spreading of the resin and therefore a reduction in the voids between the plies in the heating regions. Such a material is for example produced by successive impregnations in different resin baths.

According to one embodiment of the invention, the surface appearance of the material is granular, which makes it possible to obtain open voids after drape forming.

The partially polymerized material used within the context of the invention is thus a material that is stable over time, can be stored at ambient temperature and the polymerization of which can be reactivated simply at any moment, for example by heating.

This material has:
  a degree of impregnation of between 25% and 75% by volume of resin,
  a degree of polymerization of between 10% and 60%, irrespective of its presentation,
  a presentation that enables the manual handling or machine-handling thereof,
  a surface finish that facilitates the creation of voids and the drainage, and is therefore suitable for the drape forming process according to the invention.

According to one variant, the process for producing thermosetting composite parts according to the invention thus comprises a step of fabricating the prepreg and partially polymerized material as described above.

The process for producing thermosetting composite parts according to the invention thus has the following advantages:
  the partially polymerized resin of the prepreg plies has a rigid and dry, non-tacky appearance. The prepolymerized material is stable and is stored at ambient temperature,
  the intermediate compactions at ambient temperature are eliminated,
  the fact of partially polymerizing the material makes it possible to evacuate the solvents during this partial polymerization phase, even with materials impregnated by hot-melt extrusion coating,
  the fact that the material is already partially polymerized makes it possible to adapt the final polymerization cycle with a possible reduction in the duration,
  during the final polymerization cycle, the fact of having produced a semi-cured laminate with open voids makes it possible to obtain good drainage of the air that is not trapped, which allows, under certain conditions, treatment in an oven rather than in an autoclave. A very high vacuum must be attained before the glass transition temperature of the material is reached.

Exemplary Embodiment of the Invention

A flat panel is produced according to the following steps:
  pre-polymerization of a class 180 carbon/epoxy material to a degree of polymerization of around 40%;
  storage of the material at ambient temperature of around 21° C.;
  drape-forming of 12 crossed plies of carbon/epoxy, grade 134 g/m$^2$;
  during the drape forming, heating of the material by a laser over a line parallel to the laid-up fibers at a temperature of the order of 150° C.;
  the heating phase is immediately followed by a pressing phase using a roll;
  the pressure of the roll during the pressing phase is close to 7 bar;
  the cooling takes place during the pressing phase;
  final polymerization at a temperature of 180° C. for 2 h.

FIG. 1 illustrates the very small increase in the degree of pre-polymerization of the material during the drape forming. If the degree of polymerization before lay-up had a value "alpha", the value after lay-up will be "alpha +epsilon". The drape forming phase is represented by the temperature peak.

Figure 2:
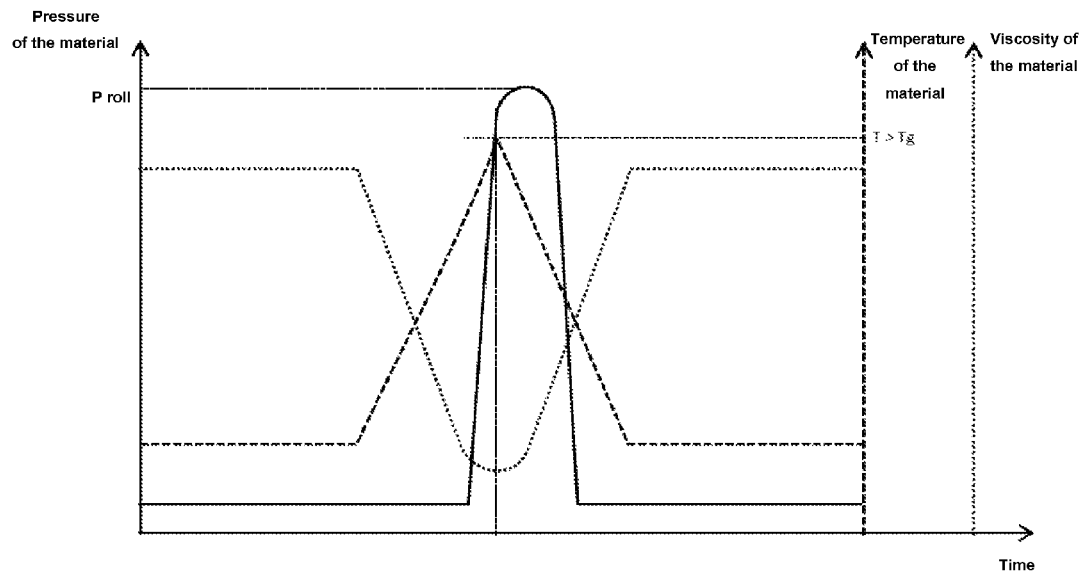

FIG. 2 illustrates the following phases:
  the increase in temperature that takes place immediately before the passage of the roll,
  at the same time as the heating, the viscosity of the material decreases. The resin becomes tacky again, or even liquid,
  once the material has reached a temperature above the glass transition temperature, the roll presses the material (increase in the pressure on the material, the departure of the roll is represented by the drop in pressure),
  during the pressing phase, it is possible to start the cooling phase,
  at the same time as the cooling, the viscosity of the material increases until the material becomes solid, rigid and dry again.

Figure 3:
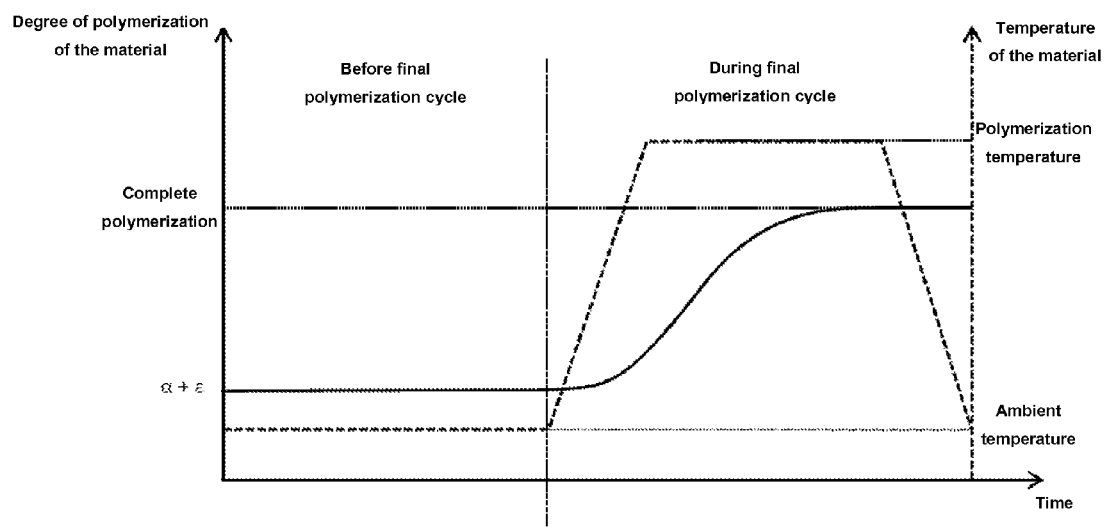

FIG. 3 illustrates the final polymerization phase. The part that has been drape formed has a degree of polymerization of "alpha+epsilon" which has not changed since the drape forming. Maintaining the part at the polymerization temperature for several hours makes it possible to completely polymerize the part.

The invention claimed is:

1. A process for fabricating a partially polymerized prepreg material, comprising the steps of: impregnating fibers with a thermosetting resin, and partially polymerizing the thermosetting resin to a degree of polymerization between 10% and 60% at a temperature between 50° C. to 180° C. to provide the partially polymerized prepreg material that can be stored at an ambient temperature, the thermosetting resin is a benzoxazine type resin.

2. The process as claimed in claim 1, wherein the partial polymerization of the thermosetting resin is carried out to a degree of polymerization between 20% and 50%.

3. The process as claimed in claim 1, wherein the step of impregnating the fibers is carried out before the step of partially polymerizing the thermosetting resin.

4. The process as claimed in claim 1, wherein the step of partially polymerizing the thermosetting resin is carried out before the step of impregnating the fibers.

* * * * *